US012555942B2

(12) United States Patent
Yi et al.

(10) Patent No.: US 12,555,942 B2
(45) Date of Patent: Feb. 17, 2026

(54) POWER CONNECTOR WITH IMPROVED TERMINAL CONFIGURATION

(71) Applicant: DONGGUAN LUXSHARE TECHNOLOGIES CO., LTD, Dongguan (CN)

(72) Inventors: Xiaogang Yi, Dongguan (CN); Kunlin Yao, Dongguan (CN); Hongji Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 295 days.

(21) Appl. No.: 18/387,705

(22) Filed: Nov. 7, 2023

(65) Prior Publication Data

US 2024/0347953 A1 Oct. 17, 2024

(30) Foreign Application Priority Data

Apr. 14, 2023 (CN) ........................ 202310402985.X

(51) Int. Cl.
*H01R 13/24* (2006.01)
*H01R 13/516* (2006.01)
*H01R 13/627* (2006.01)

(52) U.S. Cl.
CPC ........... *H01R 13/24* (2013.01); *H01R 13/516* (2013.01); *H01R 13/6272* (2013.01)

(58) Field of Classification Search
CPC .... H01R 12/721; H01R 12/73; H01R 12/737; H01R 13/24; H01R 13/516; H01R 13/6272
USPC ........................................ 439/345, 630, 637
See application file for complete search history.

(56) References Cited

U.S. PATENT DOCUMENTS 6,358,061 B1 * 3/2002 Regnier ............. H01R 13/6471 439/515
6,645,012 B2 * 11/2003 Ito ........................ H01R 12/721 439/862
6,652,322 B2 * 11/2003 Ito ........................ H01R 12/721 439/857
2006/0003634 A1 * 1/2006 Jeong ................... H04B 1/3883 439/630

(Continued)

FOREIGN PATENT DOCUMENTS

CN 212412247 U 1/2021
TW M628834 U 6/2022
TW 202234766 A 9/2022

*Primary Examiner* — Gary F Paumen
(74) *Attorney, Agent, or Firm* — Birch, Stewart, Kolasch & Birch, LLP

(57) ABSTRACT

A power connector includes an insulating body and a first terminal module. The insulating body has a mating slot configured to receive a mating module. The first terminal module includes a first power terminal and a second power terminal. The first power terminal includes a first main body and a first elastic arm bent back from one end of the first main body. The second power terminal includes a second main body and a first extension arm extending from one end of the second main body. The first elastic arm extends into the mating slot. The first elastic arm is configured to be in direct contact with the mating module. The first extension arm is configured to be electrically connected to the mating module indirectly through the first elastic arm.

20 Claims, 13 Drawing Sheets

(56) References Cited

U.S. PATENT DOCUMENTS

2012/0252275 A1* 10/2012 Tajiri .................. H01R 12/585
439/630

* cited by examiner

POWER CONNECTOR WITH IMPROVED TERMINAL CONFIGURATION

CROSS-REFERENCE TO RELATED APPLICATION

This patent application claims priority of a Chinese Patent Application No. 202310402985.X, filed on Apr. 14, 2023 and titled "POWER CONNECTOR", the entire content of which is incorporated herein by reference.

TECHNICAL FIELD

The present disclosure relates to a power connector, which belongs to a technical field of connectors.

BACKGROUND

A power connector generally includes an insulating body and a plurality of conductive terminals. When the power connector is used to transmit power, the conductive terminals include a power terminal. The insulating body defines a mating slot. The power terminal includes a mating elastic arm extending into the mating slot.

In the related art, at the initial stage of use of the power terminal, there is a relatively large plugging force between the mating elastic arm and a mating connector, which makes the plugging and unplugging not soft enough. However, after repeated plugging and unplugging, the plugging force decreases, which affects the mating effect between the mating elastic arm and the mating connector. The power terminal includes an inner layer terminal and an outer layer terminal. Both the inner layer terminal and the outer layer terminal need to be made of a material with good elasticity. However, the material with good elasticity generally reduces its ability to conduct electricity, thereby limiting the overall flow capacity.

SUMMARY

An object of the present disclosure is to provide a power connector, which is capable of making plugging and unplugging between the power connector and the mating module relatively soft.

In order to achieve the above object, the present disclosure adopts the following technical solution: a power connector, including: an insulating body defining a mating slot configured to accommodate a mating module; and a first terminal module assembled to the insulating body, the first terminal module including a first power terminal and a second power terminal; the first power terminal including a first main body and a first elastic arm bent back from one end of the first main body; the second power terminal including a second main body and a first extension arm extending from one end of the second main body; the first elastic arm extending into the mating slot; the first elastic arm being configured to be in contact with the first extension arm when the mating module is inserted in the mating slot; wherein the first elastic arm is configured to be in direct contact with the mating module; and the first extension arm is configured to be electrically connected to the mating module indirectly through the first elastic arm.

In order to achieve the above object, the present disclosure adopts the following technical solution: a power connector, including: an insulating body defining a mating slot configured to accommodate a mating module; and a first terminal module including a first power terminal and a second power terminal; the first power terminal including a first main body and a first elastic arm bent back from a front end of the first main body along a front-to-rear direction; the second power terminal including a second main body and a first extension arm extending from one end of the second main body along a rear-to-front; the first elastic arm extending into the mating slot; the first extension arm being configured to be sandwiched by the first elastic arm and the first main body when the mating module is inserted in the mating slot; wherein the first elastic arm is configured to be in direct contact with the mating module; and the first extension arm is configured to be electrically connected to the mating module indirectly through the first elastic arm.

In the present disclosure, the first elastic arm is in contact with the mating module, and the first elastic arm adopts a folded structure to form multiple elastic deformation points to disperse the plugging and unplugging force. The plugging and unplugging between the mating module and the first power terminal is relatively soft, so that the plugging force between the first elastic arm and the mating module can be kept more stable. The second power terminal is not directly plugged and unplugged with the mating module, which makes it possible for the second power terminal to be made of materials with high conductivity and weak elasticity (without affecting the overall elastic contact reliability), which greatly improves the overall current carrying capacity.

DETAILED DESCRIPTION

Figure 1:
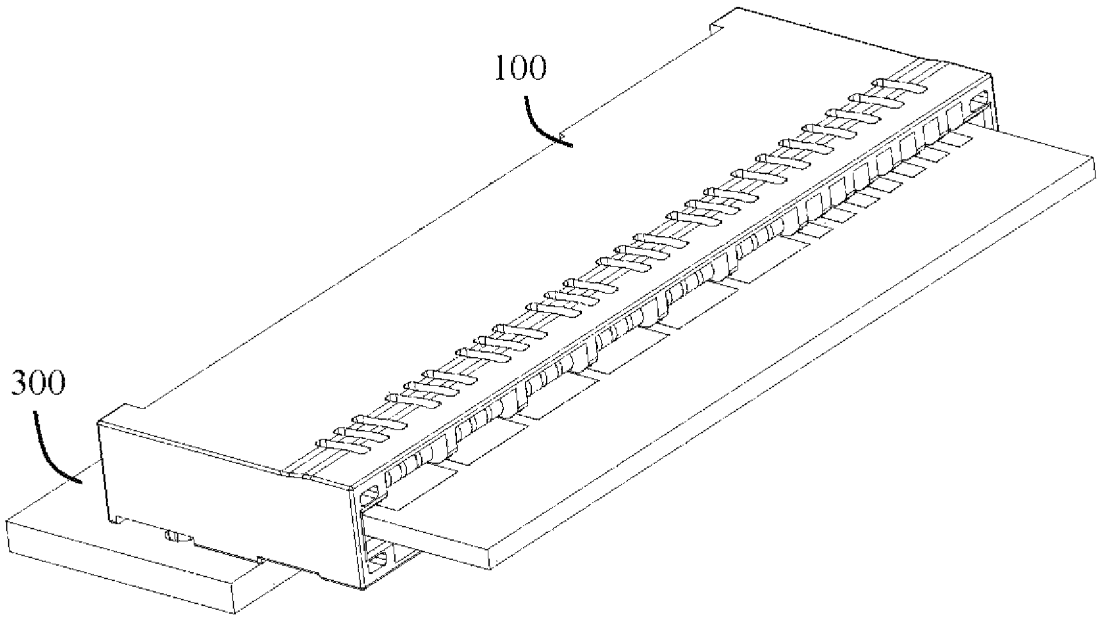
FIG. 1 is a structural schematic view of a power connector, a mating module and a circuit board in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 24, the present disclosure discloses a power connector 100 for mating with a mating module 200. The power connector 100 includes an insulating body 1, a first terminal module 2 mounted to the insulating body 1, a second terminal module 3 mounted to the insulating body 1, and a third terminal module 4 mounted to the insulating body 1.

Figure 2:
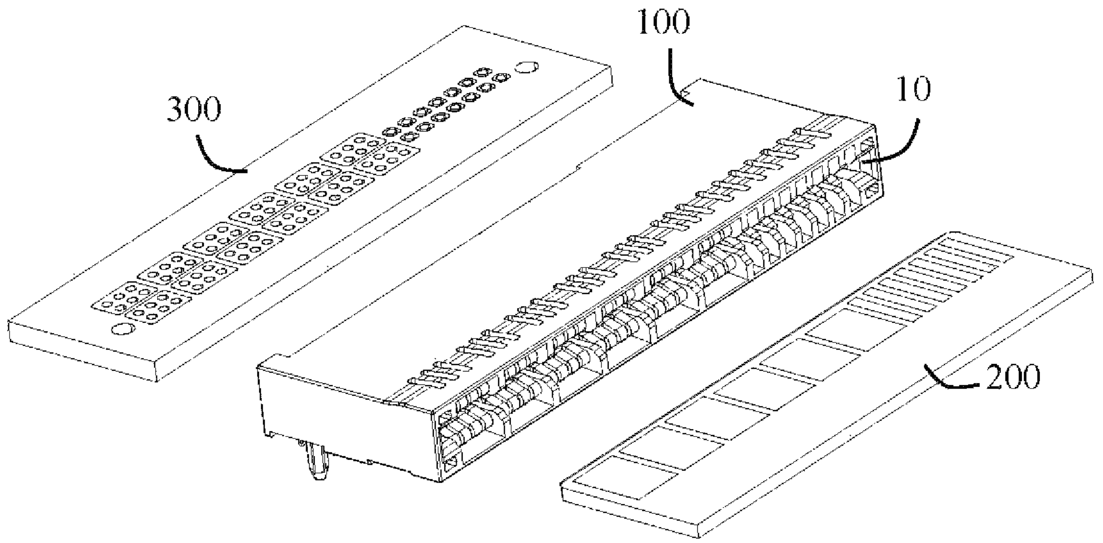
FIG. 2 is an exploded schematic view of FIG. 1.
Figure 3:
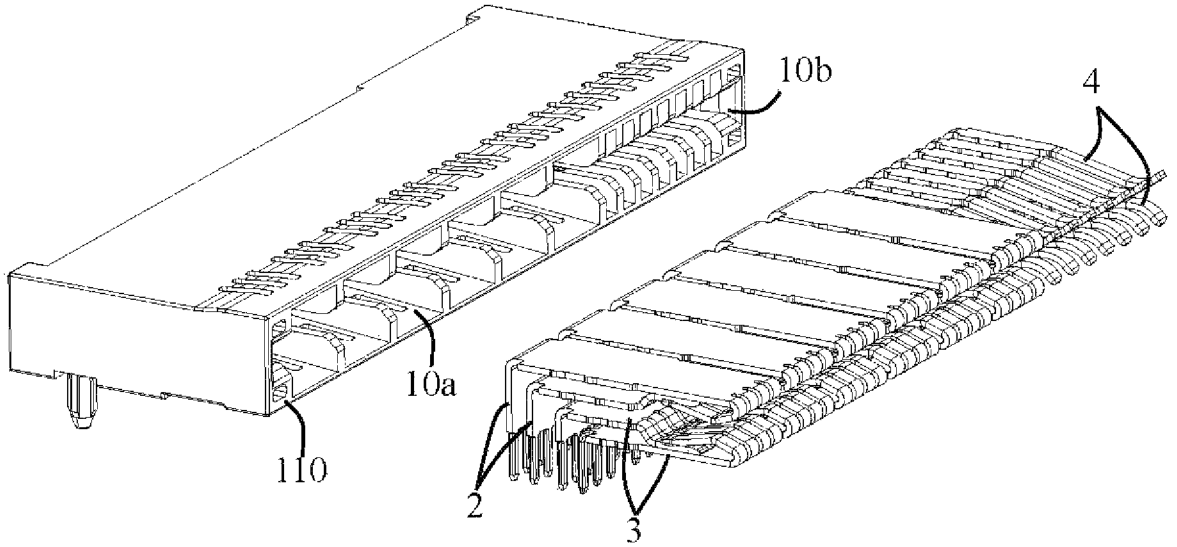
FIG. 3 is an exploded schematic view of part of the structure in FIG. 1.
Figure 4:
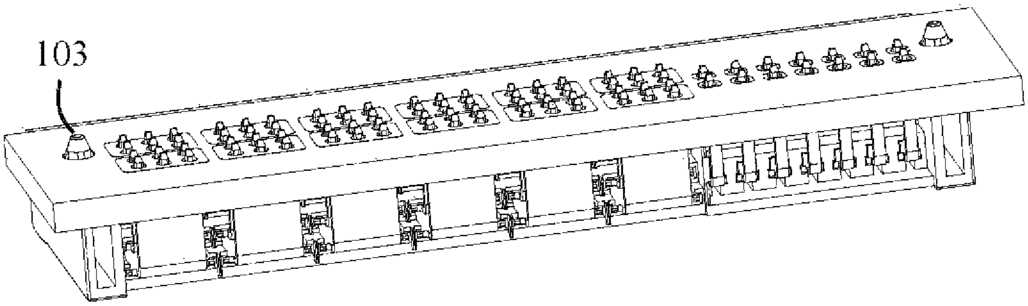
FIG. 4 is a structural schematic view of FIG. 1 from another angle.

Referring to FIG. 2, the insulating body 1 defines a mating slot 10 configured to receive the mating module 200. The insulating body 1 includes a mating surface 110, a first mating slot 10*a* extending through the docking surface 110, and a second mating slot 10*b* extending through the docking surface 110. The first mating slot 10*a* and the second mating slot 10*b* communicate with each other. The mating slot 10 includes the first mating slot 10*a* and the second mating slot 10*b*.

Figure 5:
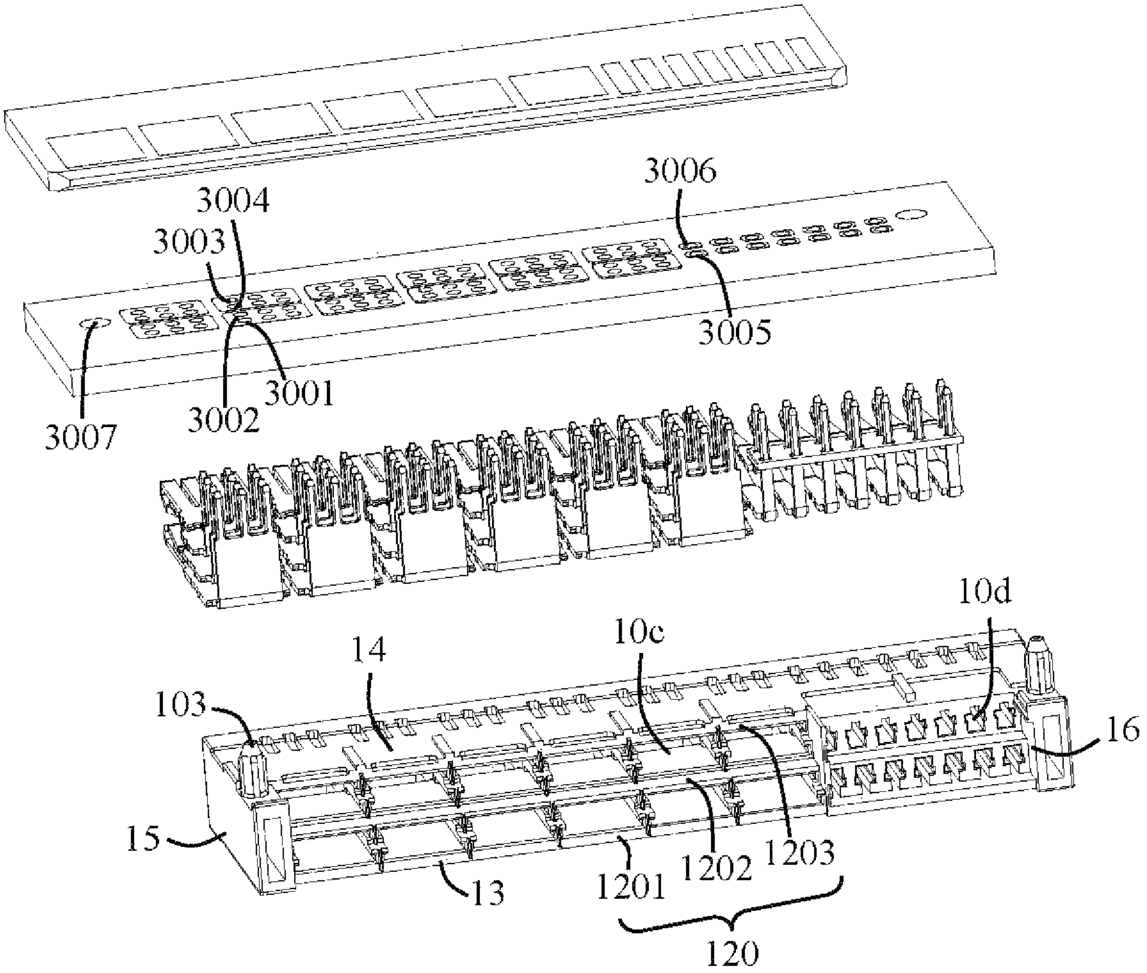
FIG. 5 is an exploded schematic view of FIG. 4.
Figure 6:
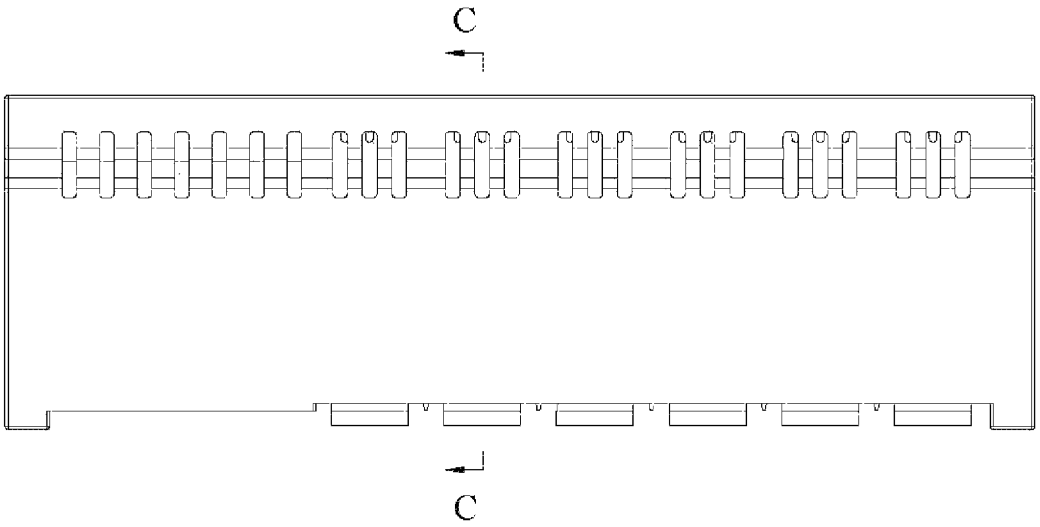
FIG. 6 is a top view of part of the structure in FIG. 1.
Figure 7:
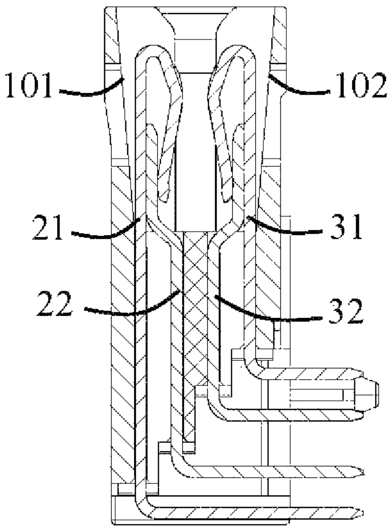
FIG. 7 is a schematic cross-sectional view taken along line C-C of FIG. 6.
Figure 8:
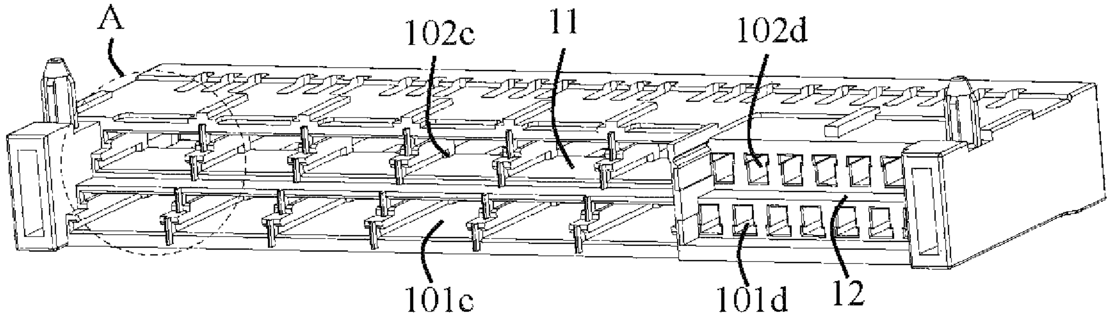
FIG. 8 is a schematic structural view of an insulating body in FIG. 5.

Referring to FIG. 5, the insulating body 1 includes a first receiving slot 10*c* communicating with the first mating slot 10*a*, and a second receiving slot 10*d* communicating with the second mating slot 10*b*. Both the first receiving slot 10*c* and the second receiving slot 10*d* extend through a rear surface 120 of the insulating body 1. Referring to FIG. 8, a first inner plate 11 is disposed in the first receiving slot 10*c*. The first inner plate 11 divides the first receiving slot 10*c* into a first sub-receiving slot 101*c* and a second sub-receiving slot 102*c*. The first sub-receiving slot 101*c* is configured to accommodate the first terminal module 2. The second sub-receiving slot 102*c* is configured to accommodate the second terminal module 3. The first inner plate 11 supports the first terminal module 2. The first inner plate 11 plays a positioning role for the second terminal module 3. The second receiving slot 10*d* is configured to accommodate the third terminal module 4. Referring to FIG. 8, a second inner plate 12 is disposed in the second receiving slot 10*d*. The second inner plate 12 divides the second receiving slot 10*d* into a third sub-receiving slot 101*d* and a fourth sub-receiving slot 102*d*. In the illustrated embodiment of the present disclosure, the first sub-receiving slot 101*c* and the second sub-receiving slot 102*c* are disposed along a thickness direction of the insulating body 1. The third sub-receiving slot 101*d* and the fourth sub-receiving slot 102*d* are disposed along the thickness direction of the insulating body 1.

Referring to FIG. 5, the insulating body 1 includes a top wall 13, a bottom wall 14 opposite to the top wall 13, a first side wall 15 connecting one end of the top wall 13 and one end of the bottom wall 14, and a second side wall 16 connecting another end of the top wall 13 and another end of the bottom wall 14. The top wall 13, the bottom wall 14, the first side wall 15 and the second side wall 16 are located on a periphery of the mating slot 10.

Continuing to refer to FIG. 5, the rear surface 120 of the insulating body 1 includes a first end surface 1201 on the top wall 13, a second end surface 1202 on the first inner plate 11, and a third end surface 1203 on the bottom wall 14. A first distance is formed between the first end surface 1201 and the mating surface 110 of the insulating body 1. A second distance is formed between the second end surface 1202 and the mating surface 110 of the insulating body 1. A third distance is formed between the third end surface 1203 and the mating surface 110 of the insulating body 1. A numerical value of the first distance is greater than a numerical value of the second distance. The numerical value of the second distance is greater than a numerical value of the third distance. That is to say, the top wall 13, the first inner plate 11 and the bottom wall 14 are distributed in steps.

Figure 10:
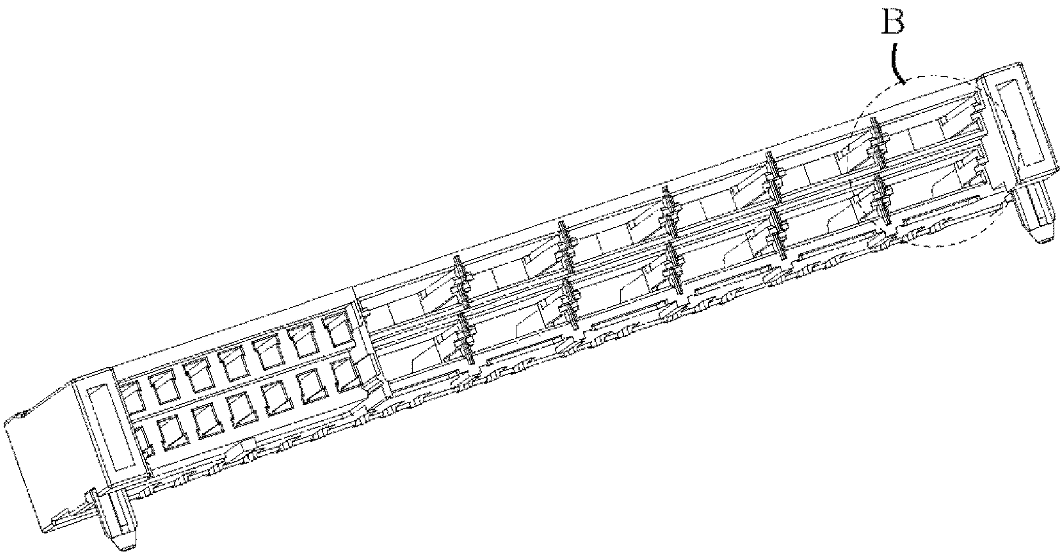
FIG. 10 is a schematic structural view of FIG. 8 from another angle.

The first terminal module 2 is mounted to the insulating body 1. The first terminal module 2 is at least partially accommodated in the first sub-receiving slot 101*c*. Referring to FIG. 10, the first terminal module 2 includes a first power terminal 21 and a second power terminal 22. The first power terminal 21 includes a first main body 211, a first elastic arm 212 bent back from one end of the first main body 211, and a first tail portion 213 extending from another end of the first main body 211. The first elastic arm 212 extends into the mating slot 10. The first elastic arm 212 is configured to be in direct contact with the mating module 200.

Figure 11:
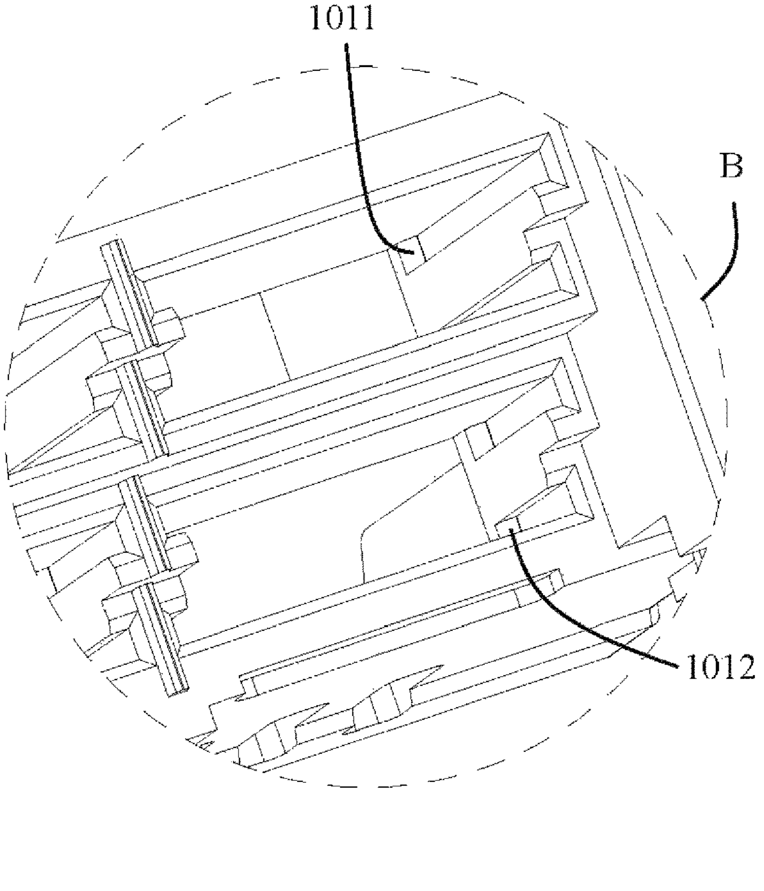
FIG. 11 is an enlarged schematic view of area B in FIG. 10.
Figure 17:
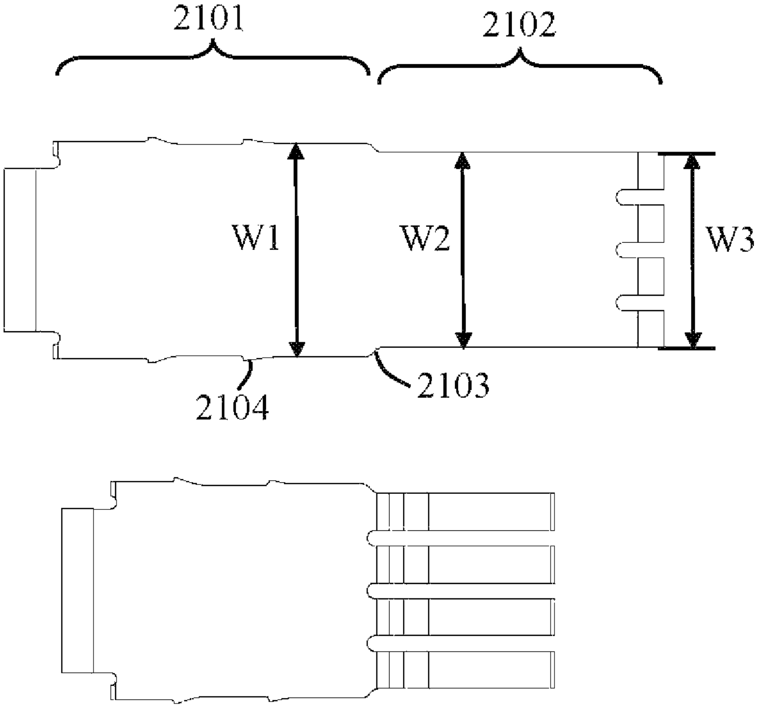
FIG. 17 is an exploded schematic view of FIG. 15 from another angle.

The first main body 211 and the first elastic arm 212 are integrally formed. Referring to FIG. 11, the first main body 211 includes a first base portion 2111 and a first bent portion 2112 bent from the first base portion 2111. The first tail portion 213 integrally extends from the first bent portion 2112. The first base portion 2111 is of a flat configuration. Referring to FIG. 17, the first base portion 2111 includes a first plate portion 2101 and a second plate portion 2102 connected to the first plate portion 2101. The first plate portion 2101 has a first width W1. The second plate portion

2102 has a second width W2. The first width W1 is greater than the second width W2. By narrowing the width of the second plate portion 2102, a first stepped portion 2103 is formed at a junction of the first plate portion 2101 and the second plate portion 2102. Referring to FIG. 11, a first abutting platform 1011 is provided in the first sub-receiving slot 101*c*. The first stepped portion 2103 abuts against the first abutting platform 1011. The first abutting platform 1011 plays a role in positioning the first power terminal 21.

Referring to FIG. 17, the first elastic arm 212 has a third width W3. The second width W2 is equal to the third width W3. The first elastic arm 212 is connected to the second plate portion 2102. The first plate portion 2101 is installed in the first sub-receiving slot 101*c*. The second plate portion 2102 extends into the first mating slot 10*a*. The first bent portion 2112 extends beyond the first sub-receiving slot 101*c*. The first plate portion 2101 is provided with a plurality of first barbs 2104 for holding the first power terminal 21 in the insulating body 1.

Figure 13:
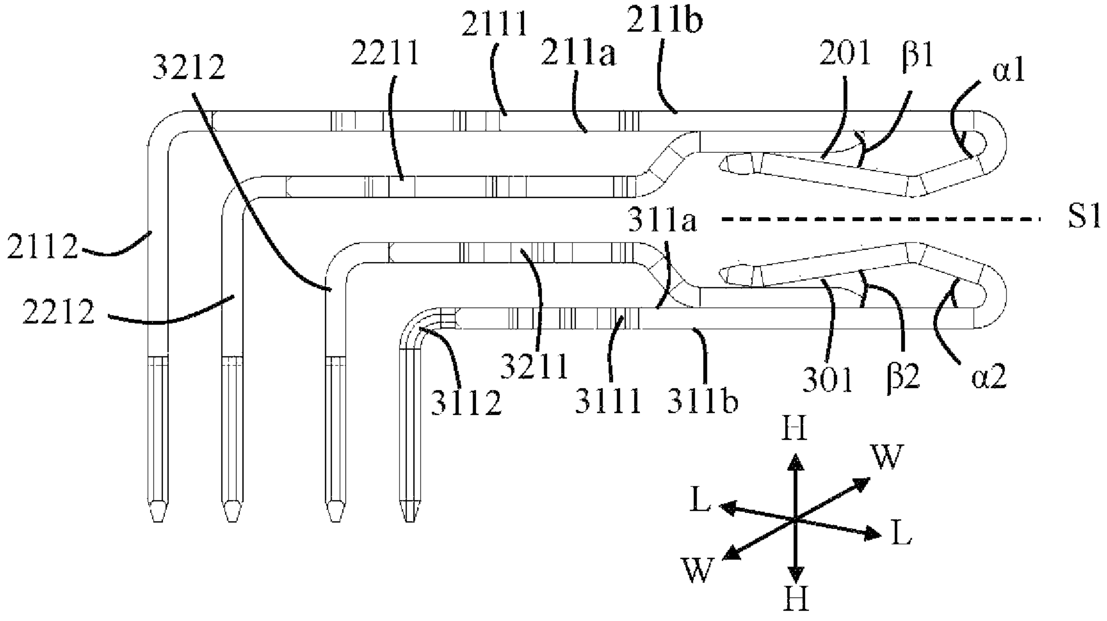
FIG. 13 is a side view of FIG. 12.

The first elastic arm 212 extends and is bent back from the first base portion 2111. Specifically, the first elastic arm 212 is formed by bending from the first base portion 2111 and extending toward a direction close to the first bent portion 2112. The first elastic arm 212 and the first bent portion 2112 are located on a same side of the first base portion 2111 in the thickness direction. As shown in FIG. 13, a first accommodation space 201 is formed between the first main body 211 and the first elastic arm 212.

Figure 15:
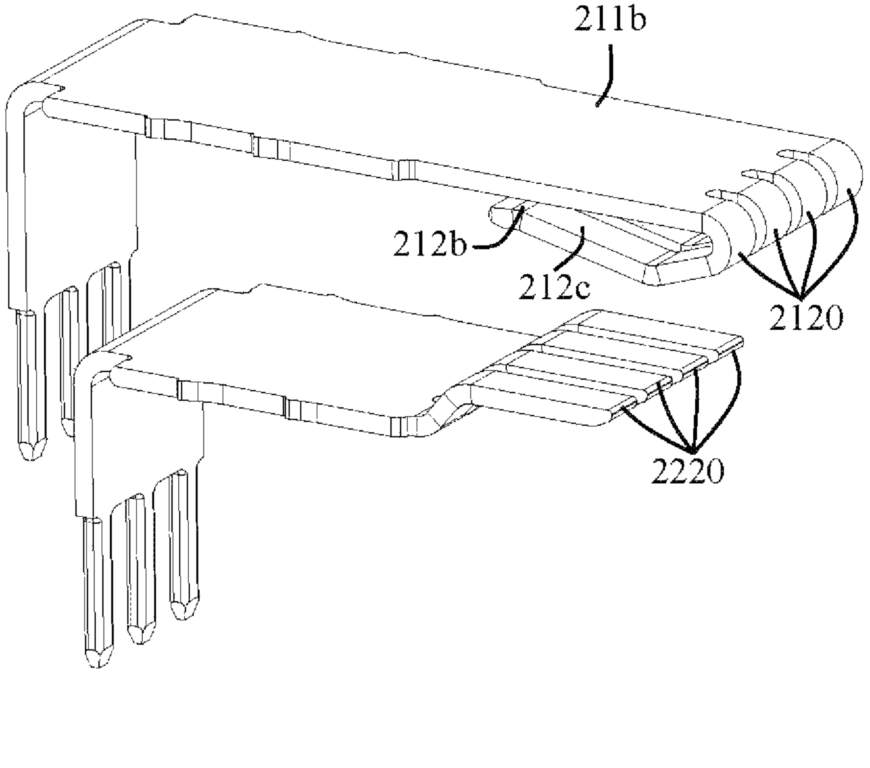
FIG. 15 is an exploded schematic view of the first power terminal and the second power terminal in FIG. 12.

Specifically, referring to FIG. 13, the first base portion 2111 has a first surface 211*a* and a second surface 211*b* which are located on opposite sides along a thickness direction of the first base portion 2111. The first elastic arm 212 is located on a side where the first surface 211*a* is located. Referring to FIG. 15, a first inner surface 212*c* of the first elastic arm 212 and the first surface 211*a* are located at a periphery of the first accommodation space 201.

Figure 14:
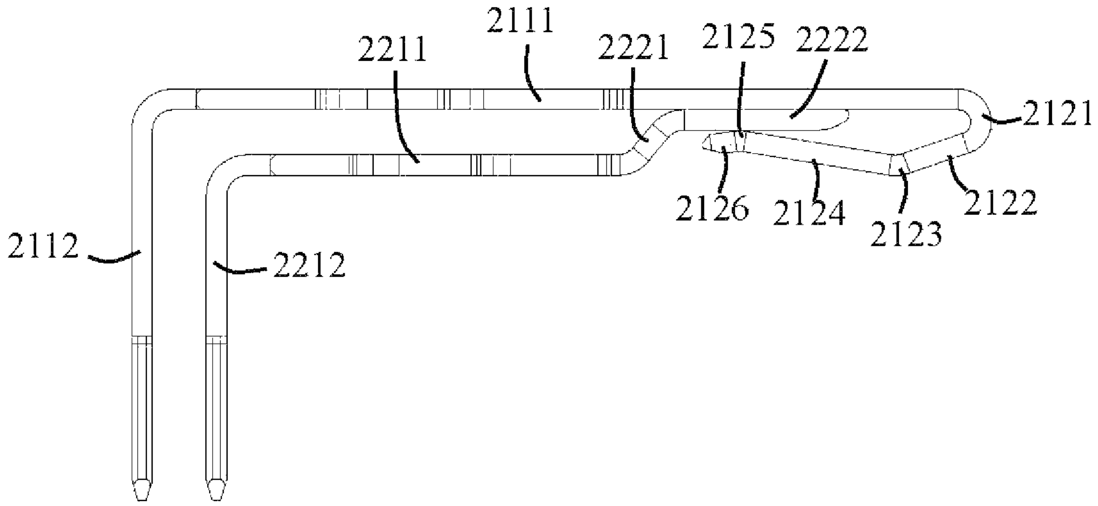
FIG. 14 is a schematic structural view of a first power terminal and a second power terminal in FIG. 13.

In some embodiments, referring to FIG. 14, the first elastic arm 212 includes a first arc portion 2121, a first inclined portion 2122, a first mating portion 2123, a second inclined portion 2124, a first abutting portion 2125 and a third inclined portion 2126. The first arc portion 2121 is connected to the first base portion 2111. The first inclined portion 2122 is connected to the first arc portion 2121. The first mating portion 2123 connects the first inclined portion 2122 and the second inclined portion 2124. The first abutting portion 2125 connects the second inclined portion 2124 and the third inclined portion 2126. The first inclined portion 2122 is inclined from the first arc portion 2121 to the first base portion 2111. The second inclined portion 2124 is inclined from the first mating portion 2123 to the first base portion 2111. However, the degree of inclination of the first inclined portion 2122 is inconsistent with the degree of inclination of the second inclined portion 2124, so that the first mating portion 2123 protrudes outward relative to the first base portion 2111, and the entire first elastic arm 212 has elasticity. The third inclined portion 2126 is inclined away from the first base portion 2111 from the first abutting portion 2125. The first mating portion 2123 is configured to be in contact with the mating module 200. Utilizing the characteristic of elasticity of the first elastic arm 212, the contact reliability between the power connector 100 and the mating module 200 is improved. The first abutting portion 2125 is configured to be in contact with the second power terminal 22.

The first elastic arm 212 adopts a folded structure, and is connected to the first base portion 2111 through the first arc portion 2121. The first arc portion 2121 can provide an elastic deformation point, and the first mating portion 2123 can provide another elastic deformation point. Compared with the traditional structure, an elastic deformation point is added to disperse the plugging and unplugging force, reduce the plugging and unplugging resistance, and make the plugging and unplugging relatively soft.

Figure 16:
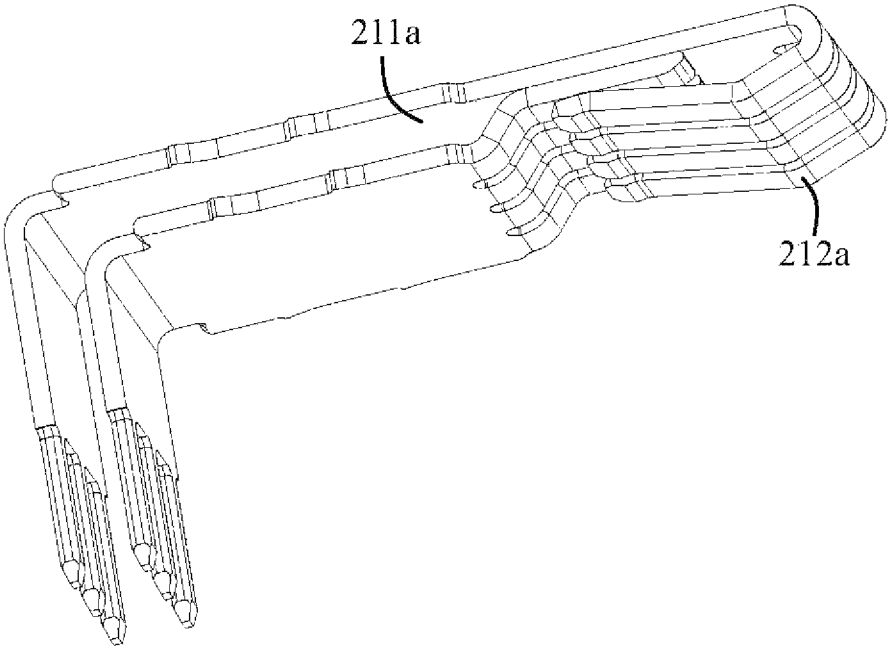
FIG. 16 is a schematic structural view of the first power terminal and the second power terminal in FIG. 12.

Specifically, referring to FIG. 16, the first mating portion 2123 includes a first arc-shaped surface 212*a*. The first arc-shaped surface 212*a* is configured to be in contact with the mating module 200. The first arc-shaped surface 212*a* protrudes away from the first surface 211*a*. By providing the first arc-shaped surface 212*a*, it is beneficial to reduce the scraping of the mating module 200 by the first mating portion 2123. Referring to the drawings, the first abutting portion 2125 includes a second arc-shaped surface 212*b*. The second arc-shaped surface 212*b* protrudes in a direction toward the first surface 211*a*. The second arc-shaped surface 212*b* protrudes in a direction opposite to that of the first arc-shaped surface 212*a*.

Figure 24:
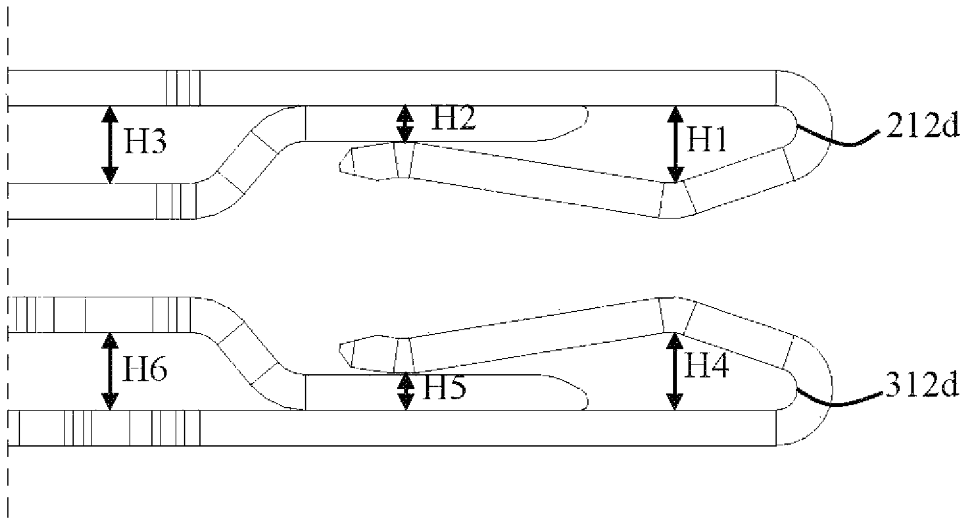
FIG. 24 is a partially enlarged schematic view of FIG. 13.

Referring to FIG. 24, the first arc portion 2121 includes a first inner arc surface 212*d*. Along a first direction H-H, a first distance H1 is formed between the first mating portion 2123 and the first base portion 2111; a second distance H2 is formed between the first abutting portion 2125 and the first base portion 2111; and a third distance H3 is formed between the first base portion 2111 and the second base portion 2211. Specifically, the first distance H1 is equal to the third distance H3. The first distance H1 is larger than a radius of a circle where the first inner arc surface 212*d* is located. The radius of the circle where the first inner arc surface 212*d* is located is larger than the second distance H2. Such arrangement is beneficial to improve the contact reliability between the first abutting portion 2125 and the first contact portion 2222. At the same time, after the mating module 200 has been plugged and unplugged for many times, it has little effect on the resilience of the first elastic arm 212, which prolongs the service life of the power connector 100.

Figure 9:
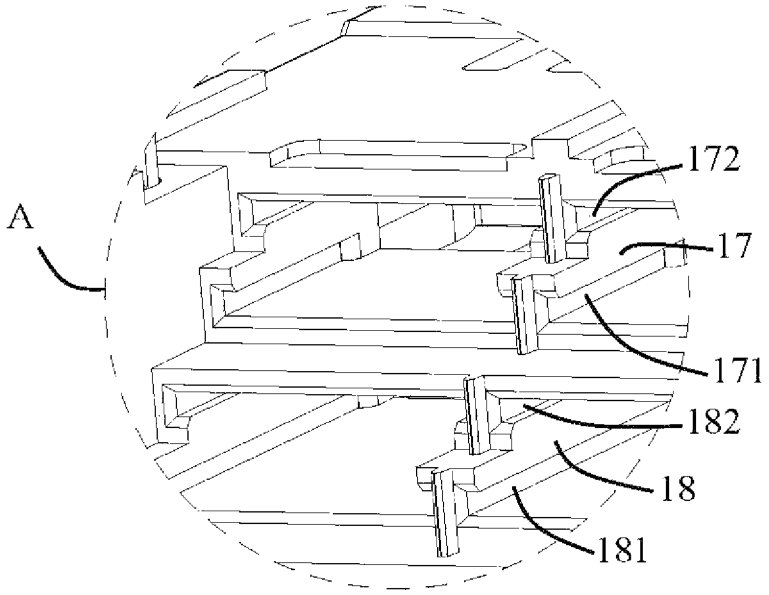
FIG. 9 is an enlarged schematic view of area A in FIG. 8.

In the illustrated embodiment of the present disclosure, the first terminal module 2 includes a plurality of the first power terminals 21 and a plurality of the second power terminals 22. The insulating body 1 includes a plurality of first sub-receiving slots 101*c*. Each of the first sub-receiving slots 101*c* is configured to accommodate one of the first power terminals 21 and one of the second power terminals 22. Referring to FIG. 9, a third inner plate 17 is provided between two adjacent first sub-receiving slots 101*c*. The third inner panel 17 is provided with a first locking slot 171 and a second locking slot 172. The first side wall 15 located on a periphery of the first sub-receiving slot 101*c* is also provided with the first locking slot 171 and the second locking slot 172. Both the first locking slot 171 and the second locking slot 172 communicate with a corresponding first sub-receiving slot 101*c*. The first power terminal 21 is held in the first slot 171, and the second power terminal 22 is held in the second locking slot 172, so as to realize the positioning installation of the first power terminal 21 and the second power terminal 22.

Figure 12:
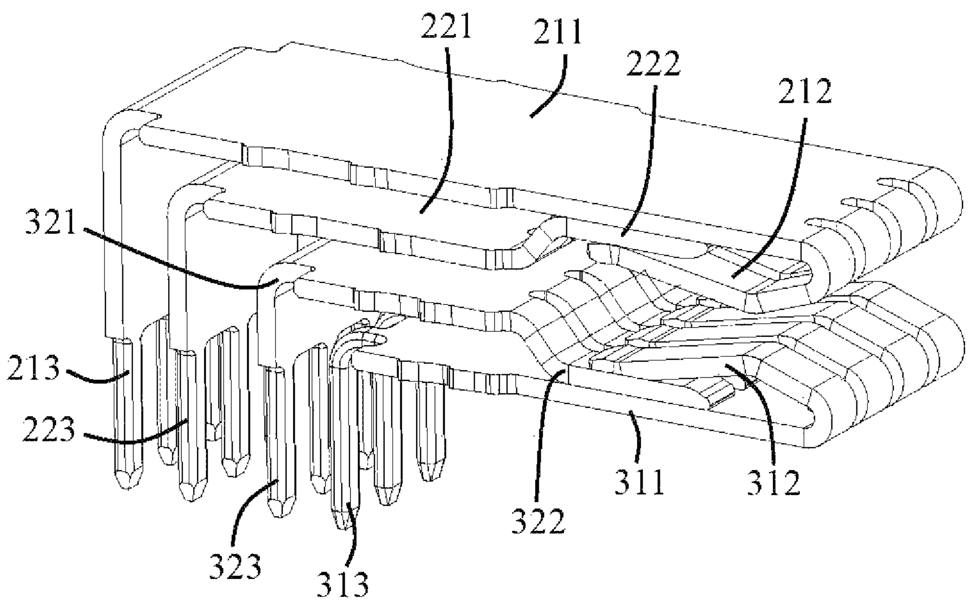
FIG. 12 is a schematic structural view of a first terminal module and a second terminal module in FIG. 3.

The second power terminal 22 is located on a side of the first surface 211*a* of the first base portion 2111. Referring to FIG. 12, the second power terminal 22 includes a second main body 221, a first extension arm 222 extending from one end of the second main body 221, and a second tail portion 223 extends from another end of the second main body 221. The first extension arm 222 is configured to be electrically connected to the mating module 200 indirectly through the first elastic arm 212. Specifically, the first extension arm 222 is configured to be in elastic contact with the first elastic arm 212 so as to realize the electrical connection between the second power terminal 22 and the mating module 200.

In some embodiments, the first extension arm 222 at least partially extends into the first accommodation space 201. The first extension arm 222 abuts against the first elastic arm 212. In another embodiment, a first gap 20*a* is formed between the first extension arm 222 and the first elastic arm 212 along the first direction H-H. The second arc surface 212*b* is configured to be in contact with the first extension arm 222. The second arc surface 212*b* is opposite to the first surface 211*a*. When the mating module 200 is inserted into the mating slot 10 and inserted in place, the first elastic arm 212 is abutted by the mating module 200 and deformed, so that the first extension arm 222 is in contact with the first elastic arm 212 in the first direction H-H. By forming the first gap 20*a* between the first extension arm 222 and the first elastic arm 212, the resisting force generated by the first elastic arm 212 on the first extension arm 222 after deformation is reduced. In other embodiments, the first extension arm 222 may also be located outside the first accommodation space 201 and abut against the first elastic arm 212.

The first power terminal 21 adopts a material having the elasticity greater than that of the second power terminal 22. In other words, the elasticity of the metal material used for the first power terminal 21 is greater than that of the metal material used for the second power terminal 22. The hardness of the metal material used by the second power terminal 22 is greater than the hardness of the metal material used by the first power terminal 21. This is because, since the first elastic arm 212 needs to be elastic, it is convenient for the first power terminal 21 to be mated with the mating module 200. The first elastic arm 212 abuts against the first extension arm 222 after being deformed, which requires the first extension arm 222 to increase its hardness, otherwise deformation is likely to occur.

In the illustrated embodiment of the present disclosure, referring to FIG. 13, the second main body 221 includes a second base portion 2211 and a second bent portion 2212 bent from the second base portion 2211. The second tail portion 223 integrally extends from the second bent portion 2212. The second base portion 2211 is flat. The second base portion 2211 is not in contact with the first base portion 2111. Specifically, the second base portion 2211 is spaced apart from the first base portion 2111 along the first direction H-H. The second bent portion 2212 is spaced apart from the first bent portion 2112. The second base portion 2211 is perpendicular to the second bent portion 2212. The first extension arm 222 is located on the side of the first surface 211*a*.

After the first terminal module 2 is assembled to the insulating body 1, two sides of the first base portion 2111 are locked in the first slot 171, so as to realize the interference fit between the first power terminal 21 and the insulating body 1, and be beneficial to improve the installation stability of the first power terminal 21. Two sides of the second base portion 2211 are locked in the second slot 172, so as to realize the interference fit between the second power terminal 22 and the insulating body 1, and be beneficial to improve the installation stability of the second power terminal 22. The first base portion 2111 is located above the second base portion 2211. A length of the first base portion 2111 along a third direction L-L is greater than a length of the second base portion 2211 along the third direction L-L.

Referring to FIG. 14, the first extension arm 222 includes a first connecting portion 2221 extending from the second base portion 2211 by bending, and the first contact portion 2222 extending from the first connecting portion 2221. The first contact portion 2222 is configured to be in contact with the first abutting portion 2125. The first contact portion 2222 is closer to the first base portion 2111 relative to the second base portion 2211.

In the illustrated embodiment of the present disclosure, the first contact portion 2222 is in contact with the first base portion 2111. The first contact portion 2222 is flat. The first contact portion 2222 is parallel to the first base portion 2111.

In the illustrated embodiment of the present disclosure, referring to FIG. 15, the first elastic arm 212 includes a plurality of first sub-elastic arms 2120 disposed at intervals along a second direction W-W. The first extension arm 222 includes a plurality of first sub-extension arms 2220 disposed at intervals along the second direction W-W. The number of the first sub-elastic arms 2120 is the same as the number of the first sub-extension arms 2220. The second direction W-W is perpendicular to the first direction H-H. The first direction H-H is the thickness direction of the first base portion 2111. The second direction W-W is a width direction of the first base portion 2111.

The second terminal module 3 is mounted to the insulating body 1. The second terminal module 3 is at least partially accommodated in the second sub-receiving slot 102*c*. Referring to FIG. 12, the second terminal module 3 includes a third power terminal 31 and a fourth power terminal 32. The third power terminal 31 includes a third main body 311, a second elastic arm 312 extending from one end of the third main body 311 by bending, and a third tail portion 313 extending from another end of the third main body 311. The second elastic arm 312 extends into the mating slot 10. The second elastic arm 312 is configured to be in direct contact with the mating module 200.

Figure 21:
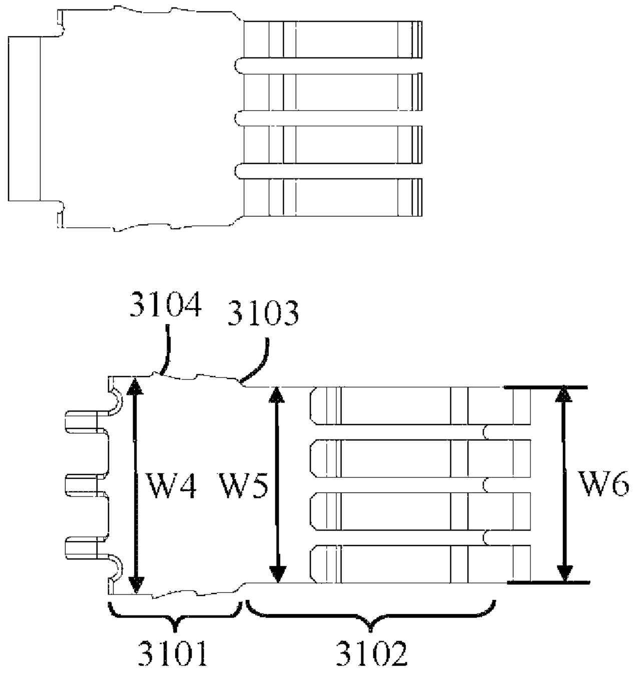
FIG. 21 is an exploded schematic view of FIG. 20 from another angle.

The third main body 311 and the second elastic arm 312 are integrally formed. Referring to FIG. 13, the third main body 311 includes a third base portion 3111 and a third bent portion 3112 bent from the third base portion 3111. The third tail portion 313 integrally extends from the third bent portion 3112. Referring to FIG. 21, the third base portion 3111 is flat. The third base portion 3111 includes a third plate portion 3101 and a fourth plate portion 3102 connected to the third plate portion 3101. The third plate portion 3101 has a fourth width W4. The fourth plate portion 3102 has a fifth width W5. The fourth width W4 is greater than the fifth width W5. By narrowing the width of the fourth plate portion 3102, a second stepped portion 3103 is formed at a junction of the third plate portion 3101 and the fourth plate portion 3102. A second abutting platform 1012 is disposed in the second sub-receiving slot 102*c*. The second stepped portion 3103 abuts against the second abutting platform 1012. The second abutting platform 1012 plays a role in positioning the third power terminal 31.

Referring to FIG. 21, the second elastic arm 312 has a sixth width W6. The fifth width W5 is equal to the sixth width W6. The second elastic arm 312 is connected to the fourth plate portion 3102. The first width W1 is equal to the fourth width W4. The second width W2 is equal to the fifth width W5. The third width W3 is equal to the sixth width W6. The third plate portion 3101 is installed in the second sub-receiving slot 102*c*. The fourth plate portion 3102 extends into the first mating slot 10*a*. The third bent portion 3112 extends beyond the second sub-receiving slot 102*c*. The third plate portion 3101 is provided with a plurality of second barbs 3104 for holding the third power terminal 31 in the insulating body 1.

The second elastic arm 312 extends and is bent back from the third base portion 3111. Specifically, the second elastic arm 312 is formed by bending from the third base portion 3111 and extending toward a direction close to the third bent portion 3112. The second elastic arm 312 and the third bent portion 3112 are located on different sides in a thickness direction of the third base portion 3111. As shown in FIG. 13, a second accommodation space 301 is formed between the third main body 311 and the second elastic arm 312.

Figure 20:
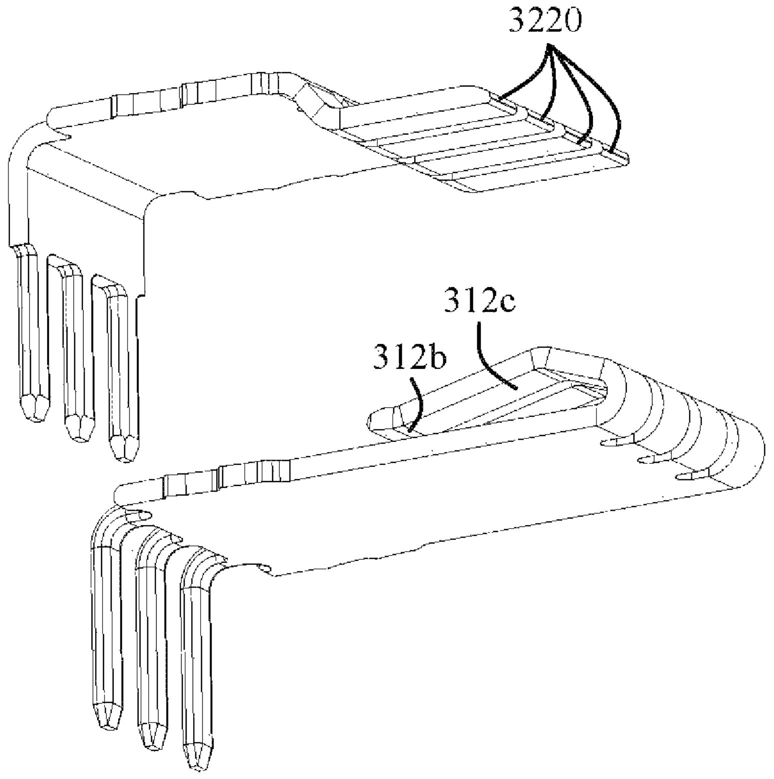
FIG. 20 is an exploded schematic view of the third power terminal and the fourth power terminal in FIG. 12.

Specifically, referring to FIG. 13, the third base portion 3111 has a third surface 311*a* and a fourth surface 311*b* which are located on opposite sides along a thickness direction of the third base portion 3111. The second elastic arm 312 is located on a side of the third surface 311*a*. The third bent portion 3112 is located on a side where the fourth surface 311*b* is located. Referring to FIG. 20, the second inner surface 312*c* of the second elastic arm 312 and the third surface 311*a* are located at a periphery of the second accommodation space 301. Referring to FIG. 13, an intermediate plane S1 is formed between the first surface 211*a* and the third surface 311*a*. The first elastic arm 212 and the second elastic arm 312 are arranged symmetrically with respect to the intermediate plane S1.

Figure 18:
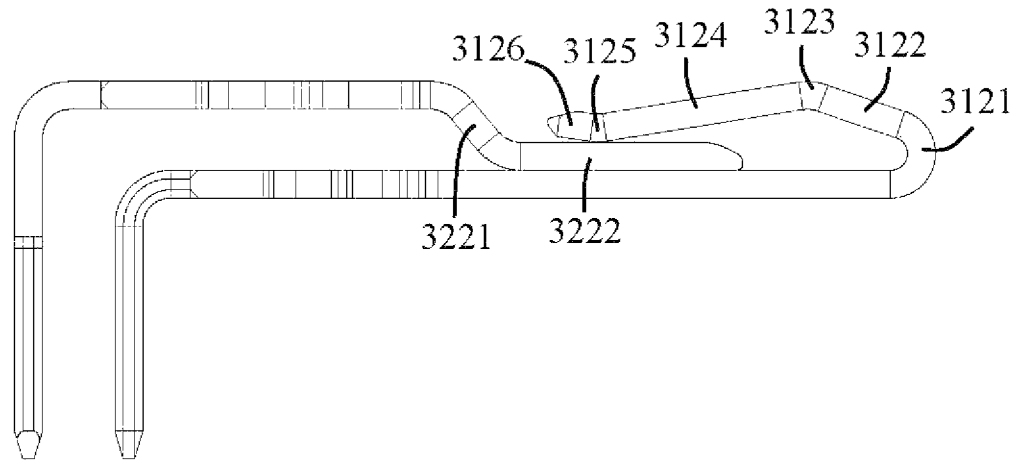
FIG. 18 is a schematic structural view of a third power terminal and a fourth power terminal in FIG. 13.

In some embodiments, referring to FIG. 18, the second elastic arm 312 includes a second arc portion 3121, a fourth inclined portion 3122, a second mating portion 3123, a fifth inclined portion 3124, a second abutting portion 3125 and a sixth inclined portion 3126. The second arc portion 3121 is connected to the third base portion 3111. The fourth inclined portion 3122 is connected to the second arc portion 3121. The second mating portion 3123 connects the fourth inclined portion 3122 and the fifth inclined portion 3124. The second abutting portion 3125 connects the fifth inclined portion 3124 and the sixth inclined portion 3126. The fourth inclined portion 3122 is inclined from the second arc portion 3121 toward the third base portion 3111. The fifth inclined portion 3124 is inclined from the second mating portion 3123 toward the third base portion 3111. However, the degree of inclination of the fourth inclined portion 3122 is inconsistent with the degree of inclination of the fifth inclined portion 3124, so that the second mating portion 3123 protrudes outward relative to the third base portion 3111, and the entire second elastic arm 312 has elasticity. The sixth inclined portion 3126 is inclined from the second abutting portion 3125 to a direction away from the third base portion 3111. The second mating portion 3123 is configured to be in contact with the mating module 200. The second elastic arm 312 has a characteristic of elasticity to improve the contact reliability between the power connector 100 and the mating module 200. The second abutting portion 3125 is configured to be in contact with the fourth power terminal 32.

The second elastic arm 312 adopts a folded structure, and is connected to the third base portion 3111 through the second arc portion 3121. The second arc portion 3121 can provide an elastic deformation point, and the second mating portion 3123 can also provide an elastic deformation point. In the embodiment shown in the present disclosure, the second elastic arm 312 forms a plurality of elastic deformation points, so that the plugging and unplugging force is dispersed, the plugging and unplugging resistance is reduced, and the plugging and unplugging between the second elastic arm 312 and the mating module 200 is relatively soft.

Figure 19:
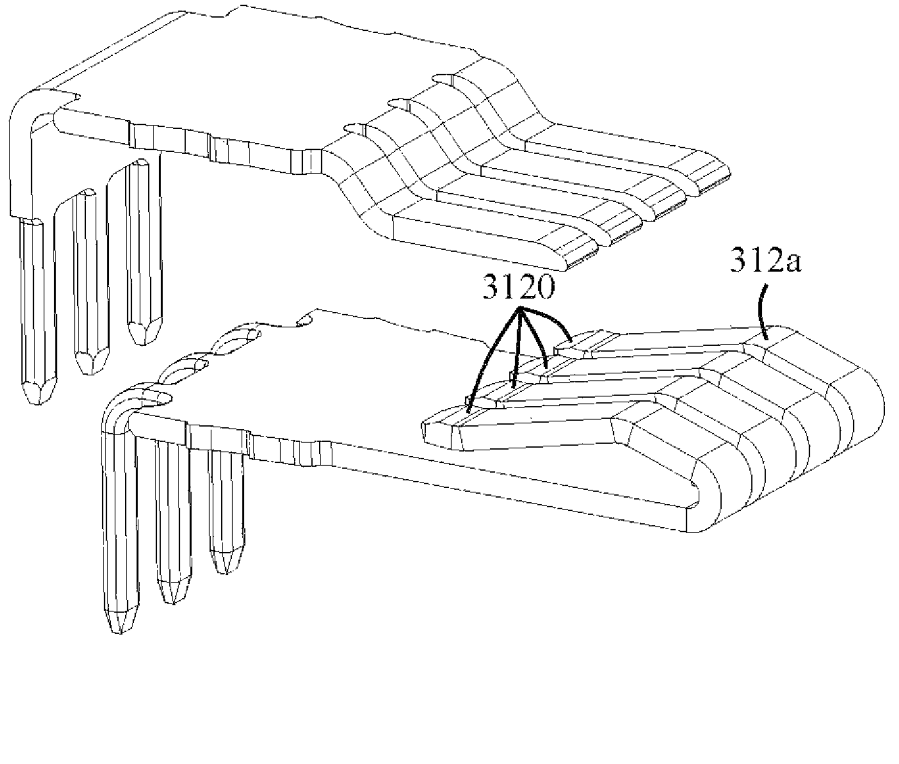
FIG. 19 is an exploded schematic view of the third power terminal and the fourth power terminal in FIG. 12.

Specifically, referring to FIG. 19, the second mating portion 3123 includes a third arc-shaped surface 312*a* configured to be in contact with the mating module 200. The third arc-shaped surface 312*a* protrudes away from the third surface 311*a*. By providing the third arc-shaped surface 312*a*, it is beneficial to reduce the scraping of the mating module 200 by the second mating portion 3123. Referring to FIG. 20, the second abutting portion 3125 includes a fourth arc-shaped surface 312*b*. The fourth arc-shaped surface 312*b* protrudes toward a direction close to the third surface 311*a*. The fourth arc surface 312*b* and the third arc surface 312*a* protrude in opposite directions.

Referring to FIG. 24, the second arc portion 3121 includes a second inner arc surface 312*d*. Along the first direction H-H, a fourth distance H4 is formed between the second mating portion 3123 and the third base portion 3111; a fifth distance H5 is formed between the second abutting portion 3125 and the third base portion 3111; and a sixth distance H6 is formed between the third base portion 3111 and the fourth base portion 3211. Specifically, the fourth distance H4 is equal to the sixth distance H6. The fourth distance H4 is larger than a radius of a circle where the second inner arc surface 312*d* is located. The radius of the circle where the second inner arc surface 312*d* is located is greater than the fifth distance H5. Such arrangement is beneficial to improve the contact reliability between the second abutting portion 3125 and the second contact portion 3222. At the same time, after the mating module 200 has been plugged and unplugged for many times, it has little effect on the resilience of the second elastic arm 312, which prolongs the service life of the power connector 100.

The first mating portion 2123 of the first power terminal 21 and the second mating portion 3123 of the third power terminal 31 are spaced along the first direction H-H. The first arc-shaped surface 212*a* of the first mating portion 2123 is opposite to the third arc-shaped surface 312*a* of the second mating portion 3123, and the protruding directions are opposite.

In the illustrated embodiment of the present disclosure, the second terminal module 3 includes a plurality of third power terminals 31 and a plurality of fourth power terminals 32. The insulating body 1 includes a plurality of the second sub-receiving slots 102*c*. Each of the second sub-receiving slots 102*c* is configured to accommodate one of the third power terminals 31 and one of the fourth power terminals 32. Referring to FIG. 9, a fourth inner plate 18 is provided between two adjacent second sub-receiving slots 102*c*. The fourth inner panel 18 is provided with a third locking slot 181 and a fourth locking slot 182. The first side wall 15 located on a periphery of the second sub-receiving slot 102*c* is also provided with the third locking slot 181 and the fourth locking slot 182. Both the third locking slot 181 and the fourth locking slot 182 communicate with a corresponding second sub-receiving slot 102*c*. The third power terminal 31 is held in the third slot 181, and the fourth power terminal 32 is held in the fourth locking slot 182, so as to realize the positioning installation of the third power terminal 31 and the fourth power terminal 32.

The fourth power terminal 32 is located on the side of the third surface 311*a* of the third base portion 3111. Referring to FIG. 13, the fourth power terminal 32 includes a fourth main body 321, a second extension arm 322 extending from one end of the fourth main body 321, and a fourth tail portion 323 extending from another end of the fourth main body 321. The second extension arm 322 is configured to be electrically connected to the mating module 200 indirectly through the second elastic arm 312. Specifically, the second extension arm 322 is configured to be in elastic contact with the second elastic arm 312 so as to realize the electrical connection between the fourth power terminal 32 and the mating module 200.

Figure 23:
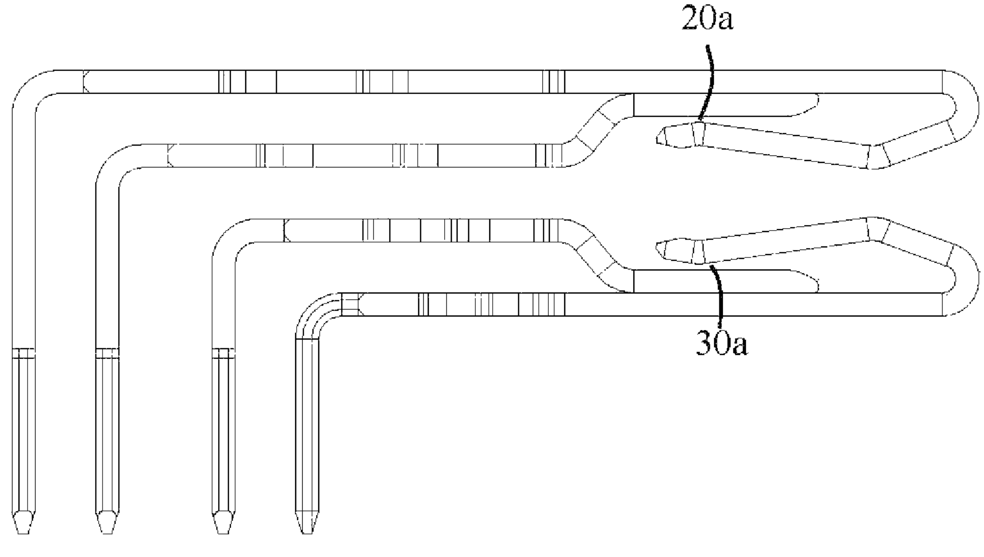
FIG. 23 is a side view of the first terminal module and the second terminal module in accordance with another embodiment of the present disclosure.

In some embodiments, the second extension arm 322 at least partially extends into the second accommodation space 301. The second extension arm 322 abuts against the second elastic arm 312. In another embodiment, as shown in FIG. 23, a second gap 30*a* is formed between the second extension arm 322 and the second elastic arm 312 along the first direction H-H. The fourth arc surface 312*b* is configured to be in contact with the second extension arm 322. The fourth arc surface 312*b* is opposite to the third surface 311*a*. When the mating module 200 is inserted into the mating slot 10 and inserted in place, the second elastic arm 312 is abutted by the mating module 200 and deformed, so that the second extension arm 322 is in contact with the second elastic arm 312 in the first direction H-H. The second gap 30*a* is formed between the second extension arm 322 and the second elastic arm 312, so that the resisting force generated by the second elastic arm 312 on the second extension arm 322 after deformation is reduced. In other embodiments, the second extension arm 322 may also be located outside the second accommodation space 301 and abut against the second elastic arm 312.

The third power terminal 31 adopts a material having elasticity greater than that of the fourth power terminal 32. The elasticity of the metal material used for the third power terminal 31 is greater than that of the metal material used for the fourth power terminal 32. The hardness of the metal material used by the fourth power terminal 32 is greater than that of the metal material used by the third power terminal 31. This is because, since the second elastic arm 312 needs to have a certain degree of elasticity, it is beneficial for the third power terminal 31 to be mated with the mating module 200. The second elastic arm 312 can abut against the second extension arm 322 after being deformed. This requires the hardness of the second extension arm 322 to be increased, otherwise the second extension arm 322 is easily deformed.

In the illustrated embodiment of the present disclosure, both the first power terminal 21 and the third power terminal 31 are made of C18150 copper material. The electrical conductivity of the C18150 copper material is 86%. Compared with the pure copper material, reducing the copper content in the C18150 copper material increases its elasticity, which is beneficial to improve the elasticity of the first power terminal 21 and the third power terminal 31. Both the second power terminal 22 and the fourth power terminal 32 are made of pure copper. The electrical conductivity of the pure copper material is 101%. Therefore, both the second power terminal 22 and the fourth power terminal 32 have high conductivity, which is beneficial to improve their current carrying capacity. The pure copper material has weak elasticity and high hardness, which meets the application requirements of the second power terminal 22 and the fourth power terminal 32. Since the conductivity of the C18150 copper material is lower than that of the pure copper material, the conductivity of the second power terminal 22 is better than that of the first power terminal 21, and the conductivity of the fourth power terminal 32 is better than that of the third power terminal 31.

The fourth main body 321 includes a fourth base portion 3211 and a fourth bent portion 3212 bent from the fourth base portion 3211. The fourth tail portion 323 integrally extends from the fourth bent portion 3212. The fourth base portion 3211 is flat. The fourth base portion 3211 is not in contact with the third base portion 3111. Specifically, the fourth base portion 3211 is spaced apart from the third base portion 3111 along the first direction H-H. The fourth bent portion 3212 is spaced apart from the third bent portion 3112. The fourth base portion 3211 is perpendicular to the fourth bent portion 3212. The second extension arm 322 is located on the side of the third surface 311*a*.

After the second terminal module 3 is assembled to the insulating body 1, two sides of the third base portion 3111 are locked in the third slot 181, so as to realize the interference fit between the third power terminal 31 and the insulating body 1, and be beneficial to improve the installation stability of the third power terminal 31. Two sides of the fourth base portion 3211 are locked in the fourth slot 182, so as to realize the interference fit between the fourth power terminal 32 and the insulating body 1, and be beneficial to improve the installation stability of the fourth power terminal 32. The third base portion 3111 is located below the fourth base portion 3211. The fourth base portion 3211 is located below the second base portion 2211. A length of the third base portion 3111 along the third direction L-L is greater than a length of the fourth base portion 3211 along the third direction L-L. A length of the first base portion 2111 along the third direction L-L is greater than a length of the third base portion 3111 along the third direction L-L. The third direction L-L is perpendicular to the first direction H-H. The first direction H-H is perpendicular to the second direction W-W.

Referring to FIG. 18, the second extension arm 322 includes a second connecting portion 3221 extending from the fourth base portion 3211 by bending, and a second contact portion 3222 extending from the second connecting portion 3221. The second contact portion 3222 is configured to be in contact with the second abutting portion 3125. In the illustrated embodiment of the present disclosure, the second contact portion 3222 is in contact with the third base portion 3111. The fourth base portion 3211 is not in contact with the third base portion 3111. The second contact portion 3222 is flat. The second contact portion 3222 is parallel to the third base portion 3111.

In the illustrated embodiment of the present disclosure, referring to FIG. 13, a length of the second inclined portion 2124 along its inclined direction is greater than a length of the first inclined portion 2122 along its inclined direction. An included angle between a surface of the first inclined portion 2122 and the first surface 211*a* is al. An included angle between a surface of the second inclined portion 2124 and the first surface 211*a* is $\beta 1$. A numerical value of $\alpha 1$ is greater than a numerical value of $\beta 1$. A length of the fifth inclined portion 3124 along its inclined direction is greater than a length of the fourth inclined portion 3122 along its inclined direction. An included angle between a surface of the fourth inclined portion 3122 and the third surface 311*a* is $\alpha 2$. An included angle between a surface of the fifth inclined portion 3124 and the third surface 311*a* is $\beta 2$. A numerical value of $\alpha 2$ is equal to the numerical value of al. A numerical value of $\beta 2$ is equal to the numerical value of $\beta 1$. The numerical value of $\alpha 2$ is greater than the numerical value of $\beta 2$. When the mating module 200 is inserted into the mating slot 10, the mating module 200 abuts against the first mating portion 2123 and the second mating portion 3123, both the first abutting portion 2125 and the second abutting portion 3125 are subjected to a force in the first direction H-H, and the first abutting portion 2125 and the second abutting portion 3125 receive less force from the first direction H-H. Therefore, the abutting pressure of the first abutting portion 2125 on the second extension arm 322 is reduced, the abutting pressure of the second abutting portion 3125 on the second extension arm 322 is reduced, and the deformation of the first extension arm 222 and the second extension arm 322 is reduced.

In the illustrated embodiment of the present disclosure, referring to FIG. 19, the second elastic arm 312 includes a plurality of second sub-elastic arms 3120 disposed at intervals along the second direction W-W. The second extension arm 322 includes a plurality of second sub-extension arms 3220 disposed at intervals along the second direction W-W. The number of the second sub-elastic arms 3120 is the same as the number of the second sub-extension arms 3220.

The first tail portion 213, the second tail portion 223, the third tail portion 313 and the fourth tail portion 323 are all fixedly connected to a circuit board 300. Referring to FIG. 5, the circuit board 300 defines a first mounting hole 3001, a second mounting hole 3002, a third mounting hole 3003 and a fourth mounting hole 3004. The first tail portion 213 is installed in the first mounting hole 3001; the second tail portion 223 is installed in the second mounting hole 3002; the third tail portion 313 is installed in the third mounting hole 3003; and the fourth tail portion 323 is installed in the fourth mounting hole 3004.

The first mating slot 10*a* adopts a bell mouth structure. That is, a space of the first mating slot 10*a* along the first direction H-H gradually expands from inside to outside. This can provide an elastic deformation space for the first power terminal 21 and the third power terminal 31, preventing the insulating body 1 from interfering with the elastic deformation of the first power terminal 21 and the third power terminal 31. Specifically, referring to FIG. 7, the insulating body 1 includes a first slot wall 101 and a second slot wall 102 opposite to the first slot wall 101. The first slot wall 101 and the second slot wall 102 are located on a periphery of the first mating slot 10*a*. Both the first slot wall 101 and the second slot wall 102 are inclined walls. A distance between the first slot wall 101 and the second slot wall 102 along the first direction H-H gradually increases from inside to outside. From inside to outside refers to an opening from an inside of the first mating slot 10*a* to an outside of the first mating slot 10*a*.

Figure 22:
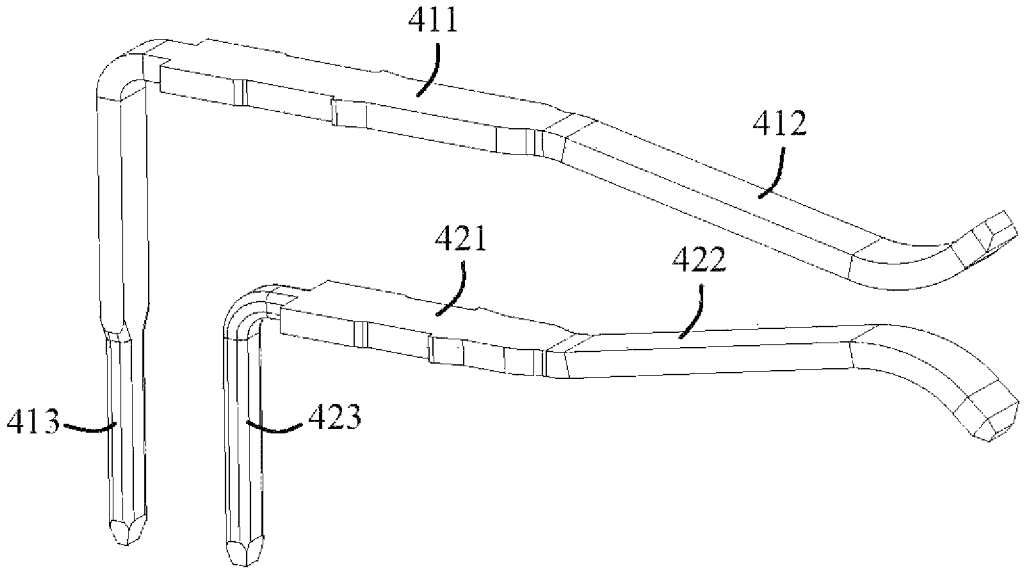
FIG. 22 is a schematic structural view of a first signal terminal and a second signal terminal in FIG. 3.

Referring to FIG. 22, the third terminal module 4 includes a first signal terminal 41 and a second signal terminal 42. The first signal terminal 41 includes a fifth main body 411, a third elastic arm 412 extending from one end of the fifth main body 411, and a fifth tail portion 413 extending from another end of the fifth main body 411. Part of the fifth main body 411 is accommodated in the third sub-receiving slot 101*d*. The third elastic arm 412 extends into the second mating slot 10*b*. The second signal terminal 42 includes a sixth main body 421, a fourth elastic arm 422 extending from one end of the sixth main body 421, and a sixth tail portion 423 extending from another end of the sixth main body 421. Part of the sixth main body 421 is accommodated in the fourth sub-receiving slot 102*d*. The fourth elastic arm 422 extends into the second mating slot 10*b*. The third elastic arm 412 and the fourth elastic arm 422 are configured to be in contact with the mating module 200. Both the fifth tail portion 413 and the sixth tail portion 423 are fixedly connected to the circuit board 300. Referring to FIG. 5, the circuit board 300 defines a fifth mounting hole 3005 and a sixth mounting hole 3006. The fifth tail portion 413 is installed in the fifth mounting hole 3005. The sixth tail portion 423 is installed in the sixth mounting hole 3006. Referring to FIG. 5, the insulating body 1 is provided with a positioning post 103, and the circuit board 300 is provided with a positioning hole 3007. The positioning post 103 is installed in the positioning hole 3007 to realize the positioning installation of the insulating body 1 and the circuit board 300.

Compared with the prior art, the first elastic arm 212 in the present disclosure adopts the folded structure. The first elastic arm 212 forms a plurality of elastic deformation points, so that the plugging and unplugging force is dispersed, and the plugging and unplugging between the mating module 200 and the first power terminal 21 is relatively soft. After the mating module 200 is plugged in place, the first elastic arm 212 of the first power terminal 21 is in direct contact with the mating module 200; and the first extension arm 222 of the second power terminal 22 is in direct contact with the first elastic arm 212, so that the second power terminal 22 is electrically connected to the mating module 200 indirectly. The first extension arm 222 abuts against the first elastic arm 212, so that the plugging force between the first elastic arm 212 and the mating module 200 can be kept stable.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A power connector, comprising:

an insulating body defining a mating slot configured to accommodate a mating module; and a first terminal module assembled to the insulating body, the first terminal module comprising a first power terminal and a second power terminal; the first power terminal comprising a first main body and a first elastic arm bent back from one end of the first main body; the second power terminal comprising a second main body and a first extension arm extending from one end of the second main body; the first elastic arm extending into the mating slot; the first elastic arm being configured to be in contact with the first extension arm when the mating module is inserted in the mating slot;

wherein the first elastic arm is configured to be in direct contact with the mating module; and the first extension arm is configured to be electrically connected to the mating module indirectly through the first elastic arm.

2. The power connector according to claim 1, wherein a first accommodation space is formed between the first main body and the first elastic arm; the first extension arm at least partially extends into the first accommodation space; and when the mating module is not inserted into the mating slot, the first extension arm abuts against the first elastic arm so that the first extension arm is in direct contact with the first elastic arm; or a first gap is formed between the first extension arm and the first elastic arm along a first direction so that the first extension arm is not in contact with the first elastic arm.

3. The power connector according to claim 1, wherein a first accommodation space is formed between the first main body and the first elastic arm; the first extension arm is located outside the first accommodation space and abuts against the first elastic arm.

4. The power connector according to claim 2, wherein the first main body comprises a first base portion and a first bent portion bent from the first base portion; the first elastic arm is formed by bending and extending from the first base portion; and wherein the first base portion has a first surface and a second surface which are located on opposite sides along a thickness direction of the first base portion;

both the first extension arm and the first elastic arm are located on a side where the first surface is located.

5. The power connector according to claim 4, wherein the first elastic arm comprises a first mating portion and a first abutting portion; the first mating portion comprises a first arc-shaped surface; the first abutting portion comprises a second arc-shaped surface; the first arc-shaped surface is configured to be in contact with the mating module; the second arc-shaped surface is configured to be in contact with the first extension arm; the first arc-shaped surface protrudes in a direction away from the first surface; and the second arc-shaped surface protrudes in a direction toward the first surface.

6. The power connector according to claim 5, wherein the first elastic arm comprises a first arc portion, a first inclined portion, a second inclined portion and a third inclined portion; the first arc portion is connected to the first base portion; the first inclined portion is connected to the first arc portion; the first mating portion connects the first inclined portion and the second inclined portion; the first abutting portion connects the second inclined portion and the third inclined portion;

a length of the second inclined portion is greater than a length of the first inclined portion; an included angle between a surface of the first inclined portion and the first surface is $\alpha 1$, an included angle between a surface of the second inclined portion and the first surface is $\beta 1$, where $\alpha 1$ is greater than $\beta 1$.

7. The power connector according to claim 5, wherein the second main body comprises a second base portion and a second bent portion bent from the second base portion; the first extension arm comprises a first connecting portion extending from the second base portion by bending and a first contact portion extending from the first connecting portion; and wherein the first contact portion is configured to be in contact with the first abutting portion; and the first contact portion is in contact with the first base portion.

8. The power connector according to claim 1, wherein the first power terminal adopts a material having an elasticity better than that of the second power terminal.

9. The power connector according to claim 7, wherein the mating slot comprises a first mating slot, the first elastic arm extends into the first mating slot, and a space of the first mating slot along the first direction gradually expands from inside to outside.

10. The power connector according to claim 9, wherein the insulating body defines a first receiving slot communicating with the first mating slot; a first locking slot and a second locking slot are provided in the first receiving slot; the first locking slot is configured to hold the first base portion; and the second locking slot is configured to hold the second base portion.

11. A power connector, comprising:

an insulating body defining a mating slot configured to accommodate a mating module; and a first terminal module comprising a first power terminal and a second power terminal; the first power terminal comprising a first main body and a first elastic arm bent back from a front end of the first main body along a front-to-rear direction; the second power terminal comprising a second main body and a first extension arm extending from one end of the second main body along a rear-to-front; the first elastic arm extending into the mating slot; the first extension arm being configured to be sandwiched by the first elastic arm and the first main body when the mating module is inserted in the mating slot;

wherein the first elastic arm is configured to be in direct contact with the mating module; and the first extension arm is configured to be electrically connected to the mating module indirectly through the first elastic arm.

12. The power connector according to claim 11, wherein a first accommodation space is formed between the first main body and the first elastic arm; the first extension arm at least partially extends into the first accommodation space; and when the mating module is not inserted into the mating slot, the first extension arm abuts against the first elastic arm so that the first extension arm is in direct contact with the first elastic arm; or a first gap is formed between the first extension arm and the first elastic arm along a first direction so that the first extension arm is not in contact with the first elastic arm.

13. The power connector according to claim 11, wherein a first accommodation space is formed between the first main body and the first elastic arm; the first extension arm is located outside the first accommodation space and abuts against the first elastic arm.

14. The power connector according to claim 12, wherein the first main body comprises a first base portion and a first bent portion bent from the first base portion; the first elastic arm is formed by bending and extending from the first base portion; and wherein the first base portion has a first surface and a second surface which are located on opposite sides along a thickness direction of the first base portion; both the first extension arm and the first elastic arm are located on a side where the first surface is located.

15. The power connector according to claim 14, wherein the first elastic arm comprises a first mating portion and a first abutting portion; the first mating portion comprises a first arc-shaped surface; the first abutting portion comprises a second arc-shaped surface; the first arc-shaped surface is configured to be in contact with the mating module; the second arc-shaped surface is configured to be in contact with the first extension arm; the first arc-shaped surface protrudes in a direction away from the first surface; and the second arc-shaped surface protrudes in a direction toward the first surface.

16. The power connector according to claim 15, wherein the first elastic arm comprises a first arc portion, a first inclined portion, a second inclined portion and a third inclined portion; the first arc portion is connected to the first base portion; the first inclined portion is connected to the first arc portion; the first mating portion connects the first inclined portion and the second inclined portion; the first abutting portion connects the second inclined portion and the third inclined portion;

a length of the second inclined portion is greater than a length of the first inclined portion; an included angle between a surface of the first inclined portion and the first surface is $\alpha 1$, an included angle between a surface of the second inclined portion and the first surface is $\beta 1$, where $\alpha 1$ is greater than $\beta 1$.

17. The power connector according to claim 15, wherein the second main body comprises a second base portion and a second bent portion bent from the second base portion; the first extension arm comprises a first connecting portion extending from the second base portion by bending and a first contact portion extending from the first connecting portion; and wherein the first contact portion is configured to be in contact with the first abutting portion; and the first contact portion is in contact with the first base portion.

18. The power connector according to claim 11, wherein the first power terminal adopts a material having an elasticity better than that of the second power terminal.

19. The power connector according to claim 17, wherein the mating slot comprises a first mating slot, the first elastic arm extends into the first mating slot, and a space of the first mating slot along the first direction gradually expands from inside to outside.

20. The power connector according to claim 19, wherein the insulating body defines a first receiving slot communicating with the first mating slot; a first locking slot and a second locking slot are provided in the first receiving slot; the first locking slot is configured to hold the first base portion; and the second locking slot is configured to hold the second base portion.

* * * * *